United States Patent Office 2,801,921
Patented Aug. 6, 1957

2,801,921
DRY MIX FOR FOODSTUFFS

William Moses, Teaneck, N. J., assignor to Wallerstein Company, Inc., New York, N. Y., a corporation of New York No Drawing. Application October 27, 1954,
Serial No. 465,141

6 Claims. (Cl. 99—94)

This invention relates to improvement in baked and other heat-processed foods made from farinaceous substances such as starch, flour or meal, in which sucrose is a component, and particularly in prepared dry mixes which are used for the preparation of such heat-processed foods.

In an important aspect, the invention relates to the preparation of flour-containing or starch-containing dry mixtures known in the grocery and baking trades as "prepared mixes" for producing baked sweet goods, doughnuts, crullers, pancakes, puddings, piecrusts, buns and non-yeast-containing rolls, popovers and other prepared breadstuffs. The class of baked sweet goods includes white cakes, yellow cakes, angel cakes, pound cakes, layer cakes, devil's food cakes, molasses cakes, brownies and cookies. Another aspect of the invention is the provision of a treatment for flour to be used in the production of baked goods prepared with sugar and chemical leavening agents.

An object of the invention is to impart to such baked goods, or otherwise heat-processed foods, improved characteristics as to texture, taste, color, moisture retention and retardation of staling.

In recent years a wide variety of packaged "prepared mixes" have become available to the housewife. The prepared mixes contain the basic ingredients required to produce these products. The housewife merely has to add simple liquid ingredients (for example, water or milk) and in some cases eggs also, mix into a batter, and bake, griddle or fry the batter. These packaged mixes enjoy wide popularity because of their convenience, as they eliminate the need for storing separate supplies and measuring out individual ingredients. Moreover, the use of such mixes assures a finished product that is more uniform and reproducible from batch to batch, thus enabling an inexperienced person to prepare fine appearing and tasty foods. Prepared mixes are also shipped from a central point to commercial bakers, restaurants and doughnut houses so as to maintain standard quality at all subsidiary shops.

These mixtures, for example, may comprise the dry ingredients ordinarily employed in cake recipes such as flour, sugar, shortening, chemical leavening agent, dried eggs, salt, milk solids, and flavoring ingredients. In cake mixes the sugar constitutes generally about 35% to 45% by weight of the dry ingredients. The term sugar as used herein denotes ordinary cane or beet sugar, chemically known as sucrose, which is used because of its high sweetening power, its free flowing properties and non-hygroscopic nature. All of these properties of sugar are desirable and necessary for the production of a successful commercial dry cake mix. The packaged product has to remain a free flowing powder, non-hygroscopic, free from lumps, and of low moisture content. The moisture content must of necessity be held low because the presence of excessive moisture causes a premature interaction of the components of the baking powder or other ingredients as well as to invite mold growth during the shelf life of the mix. As a consequence of such action, the leavening action is reduced or depleted, flavor is altered, the product becomes moldy, and the texture and quality of the baked cake will be unacceptable. For such reasons syrups as such cannot be used in such mixes.

Another requirement is that the prepared mix must lend itself to ease and rapidity of mixing with liquids at the time the batter is made.

Inasmuch as sugar constitutes an appreciable proportion of the baked product by weight, one inherent property of the sugar imparts an undesirable effect on the cake. Sugar has a tendency to dry out and crystallize. In a cake this permits a release of moisture and the baked goods become dry and stale rapidly. Appearance and taste are adversely affected. On the other hand, it has been found that the use of invert sugar syrup in cakes helps to keep the cake soft, presumably by retention of moisture. The introduction of invert sugar in amounts of 3% to 30% of the sugar content (depending upon the type of baked goods), produces a cake that is initially more moist, does not dry out, and remains soft, fresh, and palatable. This effect is no doubt related to hte inherent hygroscopic or humectant characteristics of invert syrup. Baked goods containing it tend to attract and retain moisture. The presence of invert sugar also tends to check the crystallization of other sugars present. This action is diametrically opposite in effect to that of ordinary sugar which tends to lose moisture and to crystallize into a dry, hard, granular form.

A dry cake mix containing an appropriate portion of its total sugar in the form of invert sugar is not practical and indeed is not commercially feasible. The invert sugar of commerce is only available as a syrup containing water. If incorporated into prepared mixes the water content would form clumps and prevent producing a free-flowing composition. During shelf life the absorption of moisture would intensify the dampness in the package and the preparation would no longer be a free-flowing powder but a soft to hard lumpy mass. Such a mass could not be formed into a smooth batter easily and quickly.

Most important, the presence of the moisture contributed by the invert sugar would, as pointed out above, cause deleterious chemical interactions to take place between the chemical leavening components so as to destroy leavening properties; and desirable as the use of invert sugar may be, the adverse physical properties and chemical reactions eliminate it from consideration for any commercial mix. Another important disadvantage is that the development of microorganisms would take place with resultant spoilage in the package.

I have found that dry preparations of the enzyme invertase may be incorporated into dry prepared batter mixes to produce a free-flowing, dry, granular or powdery mix that remains so during its normal shelf life. I have found that the enzyme preparation invertase, although heat labile, sustains its activity sufficiently during the contacting with the water in preparing the batter and during a sufficient part of the heating period to convert sucrose to invert sugar. I believe that other associated enzymatic reactions may also take place in the undefinable chemical complexes that form and reform during baking. I have also found that the batters prepared from these prepared mixes when suitably heated as by baking, griddling or frying, produce products of enhanced quality with respect to appearance, color, taste, texture, moisture content, moisture retention, lightness, increased volume and remain fresh longer by virtue of the imparted anti-staling characteristic.

Baked goods containing the invertase are more moist when first baked than goods baked from a comparable mix without the enzyme, and after several days of standing the cake from the invertase mix is still soft, moist and fresh in appearance whereas the control cake is hard, dry and stale.

In the dry state the invertase has no effect on the other dry ingredients. It does not impair the necessary free-flowing properties of the mixture, nor does it affect the hygroscopicity of the mixture. It has no effect on the baking powder and its presence causes no deterioration in any other way.

In addition to the non-staling characteristics imparted to cakes baked from prepared dry cake mixes containing the enzyme invertase, I have observed other surprising effects, which do not appear to be related entirely—if at all—to the hygroscopicity of the invert sugar. These results are not obtained when invert syrup is used in the recipe as a replacement for the enzyme preparation. The cakes prepared from prepared mixes containing invertase rise higher and have a better crumb structure than cakes baked from identical formulae without the enzyme.

I have found also that the doughs from mixes containing invertase produce cakes with a more pleasing brown crust color and do not have to be overbaked to produce a desirable rich brown crust.

The use of invertase produces an effect upon the cake similar to the incorporation of eggs in the recipe. This result may possibly be connected with the hydrolysis of sucrose during the critical baking stage with the absorption of water from the setting and coagulating dough forming the crumb of the cake. The loss of the free water at this critical stage appears to alter the dough structure so that there is less settling of the dough and a greater retention of $CO_2$ is obtained. This action may account for the increased volume obtained with cakes baked with active invertase in the dough.

I have described one group of products, cakes, derived from a heat-processed batter wherein the heating of the batter is conducted in an oven and known as baking. The description and disclosure in the foregoing exemplifies and describes my invention as applied to other types of dry prepared mixes wherein the heating is derived by other means, for example, dry prepared mixes containing sucrose and starch or flour to which a liquid is added to form a batter and heated on a griddle such as pancakes, flapjacks and waffles. The invention as disclosed is also applicable to dry mixes from which a batter is made by incorporating a fluid and the batter is fried, such as for making crullers, doughnuts and fritters. All such heating methods are included in the term "heat-processing operation" as used herein.

For certain purposes it may be desirable to incorporate the invertase enzyme preparation in starch or in cereal flours for distributional or specialty purposes. Cake flours and pancake flours without other ingredients or prepared starches for puddings are examples of compositions to which invertase enzyme preparations may advantageously be added. It is also common in the doughnut and waffle industry to have a central depot to supply standardized materials in order to maintain uniformity of products by all branch shops. In such cases the invertase enzyme preparation may be incorporated into the flour or the dry prepared mix of standard formulations.

The amount of invertase added to dry prepared mixes depends upon the type of cake or other product being baked or otherwise heated, the extent of the effect desired and the enzyme activity of the invertase employed. The activity of the invertase may be determined by the methods described in Methods of Analysis of the Assoc. of Official Agricultural Chemists, (7th edition, page 500, 1950) the activity being expressed as the unimolecular reaction velocity content, K per ml. of liquid or per gram of solid preparation.

Amounts of invertase in the range of 0.1% to 2% of an invertase preparation with a K value of about 0.01 per gram gives satisfactory results. The amounts employed in practicing the invention depend upon the type of finished product, the recipe used, the heating conditions employed and the extent of effect desired. As an illustration of the results obtainable a tabulation of analytical data is given in Table I. The above range of invertase concentrations is given as an average working range and is not to be construed as limiting the invention. Invertase preparations with higher or lower K values may be employed and the amount may be adjusted so as to produce the desired effect. For instance, amounts from about 0.01% up to 10% by weight may be used and K values from about 0.0001 to 1 per gram employed. The limiting factor is usually one of economics.

The enzyme invertase may be obtained from plants or microorganisms. The highest concentrations are found in yeast but the enzyme may also be obtained from fungal and bacterial sources. The enzyme may be used either in a crude form or as a purified preparation in the dry prepared mixes. Purification of the enzyme preparation may be effected by methods well known in the art, for example, extraction from the microorganism and precipitation with non-aqueous solvents. The crude enzyme preparations give equally satisfactory results as the purified preparations of equivalent activity.

A crude enzyme preparation may be prepared by treating 100 parts of compressed bakers' yeast with about 200 parts of cold acetone. The yeast is well stirred into the acetone and after thorough mixing the yeast may be separated as by filtration through a Buchner funnel using suction. The residue on the filter is sucked dry and the acetone is evaporated therefrom. The dried material is the crude enzyme preparation which may be used in this invention. The activity of the preparation depends upon the invertase content of the original yeast, but is generally in the neighborhood of a K value of 0.005 to 0.02 per gram.

In general, the composition of the invention comprises dry mixtures of farinaceous substances, such as flours, meals or starch with an invertase enzyme preparation. The compositions either contain sucrose or sucrose is subsequently added thereto, and other common ingredients of farinaceous foodstuffs may be contained in the compositions or added thereto at the time of use.

The following examples are given for purposes of illustration and disclosure and are not intended to limit the scope of the invention. Numerous other formulae or recipes are easily devised for the preparation of dry prepared mixes for other types and variants of heat-processed goods, but the invention broadly comprises the introduction of an active invertase preparation into the sucrose-containing dry prepared mix, cake flour or other prepared flours so that enzymatic action takes place in the batter during its preparation and baking.

EXAMPLE I.—YELLOW CAKE MIX

| Ingredient | Amount |
|---|---|
| Flour | parts by weight 100 |
| Sugar | do 125 |
| Emulsified shortening | do 45 |
| Dried eggs | do 13 |
| Baking powder | do 5¾ |
| Salt | do 2½ |
| Crude invertase preparation (K value=0.011 per gram) | parts by weight 3.5 |
| Flavoring | q. s. |

The ingredients are sifted and mixed dry and then packaged. In baking about 100 parts of the dry mix are formed into a batter with approximately 50 parts of milk. This batter is placed in suitable baking pans and baked for about 20 minutes in a 375° oven as is common and usual in the art.

EXAMPLE II.—CHOCOLATE BROWNIE MIX

| | Parts by weight |
|---|---|
| Sugar | 225 |
| Chocolate liquor powder | 33 |
| Eggs (whole dried) | 41 |
| Flour (cake) | 50 |
| Salt | 0.5 |
| Vanilla | 0.5 |
| Soda | 0.25 |
| Purified invertase preparation (K value=0.17 per gram) | 0.5 |

The above ingredients are thoroughly mixed and blended and packaged. For use in baking, about 100 parts of the above dry mixture are made into a batter with about 14 parts of water. If desired, about 20 parts of nutmeats may be added. The batter is placed in a suitable baking pan and baked for about 30–40 minutes in an approximately 375° oven, or until done, as is common and usual in the art.

EXAMPLE III.—CHOCOLATE FUDGE CAKE MIX

| | Parts by weight |
|---|---|
| Sugar | 193 |
| Flour | 100 |
| Shortening | 65 |
| Eggs (whole dried) | 24 |
| Cocoa | 48 |
| Dry milk solids, non-fat | 20 |
| Salt | 3.8 |
| Baking powder | 3.0 |
| Soda | 1.3 |
| Purified invertase preparation (K value =0.38 per gram) | 0.25 |

The above dry ingredients are thoroughly mixed and blended before packaging. About 100 parts of this dry mixture are formed into a suitable batter with approximately 33 parts of water. This batter is then panned and baked in the usual manner.

EXAMPLE IV.—WHITE CAKE MIX

| | Parts by weight |
|---|---|
| Sugar | 178.5 |
| Flour | 127.5 |
| Fat | 70.0 |
| Egg whites (dried) | 12.5 |
| Dry milk solids | 14.5 |
| Baking powder | 8.0 |
| Salt | 5.0 |
| Flavoring | 3.0 |
| Crude invertase preparation (K value=0.01 per gram) | 0.50 |

Thoroughly mix and blend the above dry ingredients. For use in baking, about 100 parts of the dry mixture are made into a suitable batter with about 37–45 parts of water. This batter is then baked in a 375° F. oven in the usual manner.

EXAMPLE V.—ANGEL FOOD CAKE

| | Grams |
|---|---|
| Sugar | 318 |
| Egg whites (dried) | 44.5 |
| Flour | 109 |
| Salt | 4.9 |
| Cream of tartar | 4.9 |
| Crude invertase preparation (K value=0.01 per gram) | 0.75 |

The egg whites are packed separately from the rest of the ingredients. The other ingredients are mixed and thoroughly blended together. To bake the cake, place 320 ml. of water into a bowl, add the egg whites and stir until dissolved. Beat hard until very stiff peaks are formed. Sift about ¼ of the flour over the beaten egg whites and fold in. Add the rest of the flour in a similar manner in three equal portions and fold in thoroughly. Pour into a 10-inch tube pan and bake for 35 to 40 minutes at 375° F.

EXAMPLE VI.—CORN MUFFINS

| | Parts by weight |
|---|---|
| Yellow corn meal | 150 |
| Flour | 100 |
| Sugar | 90 |
| Shortening | 60 |
| Milk solids (non-fat) | 25 |
| Eggs (whole dried) | 14.5 |
| Baking powder | 10.0 |
| Salt | 5.0 |
| Soda | 2.5 |
| Crude invertase preparation (K value=0.005 per gram) | 0.9 |

Mix, sift, and blend the above dry ingredients. When ready to bake, take 100 parts of the dry mixture and prepare a suitable batter by mixing in about 30 parts of water. Transfer the batter to muffin pans and bake in a moderate (375° F.) oven for 20 minutes or until muffins are golden brown in color.

EXAMPLE VII.—DOUGHNUTS AND CRULLERS

| | Parts by weight |
|---|---|
| Flour | 340 |
| Sugar | 220 |
| Shortening | 30 |
| Dried eggs | 30 |
| Dried milk | 25 |
| Baking powder | 10 |
| Salt | 5 |
| Crude invertase preparation (K=0.02 per gram) | 3.3 |

The above ingredients are sifted and mixed dry and thoroughly blended together. The dry mixture is then packaged in convenient quantities. For the preparation of doughnuts, about 245 parts of water is added to the above mixture and formed into a batter. The batter is formed into the shape of an annulus by the doughnut machine and the batter is fried in deep fat at approximately 185° C. until browned to the proper degree. It is then turned over and the other side cooked in the usual manner. The temperature of frying the batter containing invertase is usually a little lower than that normally employed for a non-invertase treated batter, as it is found that the invertase batter tends to brown and form a crust more rapidly than untreated batters. Doughnuts prepared with the batter containing invertase will be found to be more moist and retain their moist crumb structure, and remain soft and fresh for longer periods of time than doughnuts prepared from untreated batters.

In addition to its use in prepared cake mixes, the invertase may be added directly to flour or other ingredients to be used in baking cakes, in such cases where sugar and baking powder are to be included in the recipe. This cake flour with its active invertase will have the improved properties noted above and produce improved baked goods when used either in the home or in the bake shop. The invertase may also be added to the so-called self-rising cake flour which consists of a mixture of flour, baking powder and salt.

The initial moisture content of various baked goods are shown in Table I. In general, samples held in storage have shown a significant retention of moisture when an invertase preparation was included in the recipes.

Table I

| Type of Cake | Amount of Invertase Added [1] | Reducing Sugars as Invert Sugar, Percent | Initial Moisture in Percent | Appearance 1 Day After Baking | Appearance After 1 Week or More |
|---|---|---|---|---|---|
| Yellow | None | 0.8 | 30.2 | Light crust | Firmest. |
|  | 0.4% of K=.011/gm | 4.4 | 31.6 | Darker crust | Softer and more moist. |
|  | 1.2% of K=.011/gm | 8.5 | 32.5 | Darkest crust, best appearance, greatest volume. | Softest, freshest. |
| Chocolate Brownies | None | 0.4 | 8.2 | Dry and crumbly, Low volume. | Hard and dry. Stale taste. |
|  | 0.04% of K=.40/gm | 18.8 | 11.2 | Soft and cake-like texture. Better crust and color. | Soft and fresh—good flavor. |
| Chocolate Cake | None | 1.9 | 32.2 | Reddish-brown crumb-light crust. Low volume. | Hard and dry—staling. |
|  | 1.2% of K=.011/gm | 9.6 | 32.8 | Chocolaty-brown crumb—darker crust—High volume. Softer and more moist crumb. | Soft and fresh—good flavor. |
| White Cake | None | 1.0 | 30.7 | Light crust and crumb | Soft. |
|  | 0.02% (K=.11/gm.) | 5.8 | 30.8 | Darker crust and crumb—softer and more moist crumb. | Much softer, outside tacky, soft slice. |
| Yellow Cake | None | 0.5 | 29.6 | Light crust and crumb | Soft, light golden yellow. |
|  | 0.2% (K=.02/gm.) | 7.1 | 29.4 | Slightly darker crust and crumb, same texture as untreated. | Soft, slightly fresher taste, dark golden yellow. |
| Doughnuts | None | 0.4 | 11.9 | Very light brown hard and sharp, break-hard bite. | Hard and sharp, break-hard bite. |
|  | 0.5% (K=.02/gm.) | 2.1 | 15.5 | Browner, soft break and bite. | Firm, softer—softer break, firm bite. |
| Corn Muffins | None | 0.6 |  | Golden yellow firm | Firm—inside and outside. |
|  | 0.5% (K=.02/gm.) | 7.6 |  | Brownish yellow firm, coarser grain. | Firm—slightly softer inside and outside. |
|  | 1.0% (K=.02/gm.) | 8.4 |  | Dark brown yellow, firm and coarser grain. | Softer—inside and outside. |
| Cookies | None | 1.3 | 10.9 | Firm, golden yellow | Firm—sharp break and bite. |
|  | 0.5% (K=.02/gm.) | 9.1 | 11.2 | Softer and moist dark golden yellow. | Softer—soft bite. |
|  | 1.0% (K=.02/gm.) | 12.8 | 15.9 | Soft brownish yellow | Softest—soft bite. |

[1] Based on dry ingredients.

I claim:

1. A dry free-flowing mixture for the production of baked and fried foodstuffs comprising flour, sucrose, and an invertase enzyme preparation substantially free from viable yeast cells and containing an amount of invertase sufficient to effect the inversion of a substantial proportion of the sucrose during the conversion of the mixture into the finished foodstuff.

2. A dry free-flowing mixture for the production of baked and fried foodstuffs comprising flour, sucrose, and from 0.01 to 10% by weight of an invertase enzyme preparation having a K value of from about 0.0001 to about 1 per gram and substantially free from viable yeast cells.

3. A dry free-flowing mixture for the production of baked and fried foodstuffs comprising flour, sucrose, a chemical leavening agent, and an invertase enzyme preparation substantially free from viable yeast cells and containing an amount of invertase sufficient to effect the inversion of a substantial proportion of the sucrose during the conversion of the mixture into the finished foodstuff.

4. A dry free-flowing mixture for the production of baked and fried foodstuffs comprising flour, sucrose, a chemical leavening agent, and from 0.01 to 10% by weight of an invertase enzyme preparation having a K value of from about 0.0001 to about 1 per gram and substantially free from viable yeast cells.

5. The improvement in the preparation of dry mixes for the production of baked and fried foodstuffs which comprise adding to the dry mix an invertase enzyme preparation substantially free from viable yeast cells and containing an amount of invertase sufficient to effect the inversion of a substantial proportion of the sucrose content of the mix during the conversion of the mix into the finished foodstuff.

6. The improvement in the preparation of dry mixes for the production of baked and fried foodstuffs which comprise adding to the dry mix from 0.01 to 10% by weight of an invertase enzyme preparation substantially free from viable yeast cells and having a K value of from about 0.0001 to about 1 per gram.

References Cited in the file of this patent

UNITED STATES PATENTS

| 74,826 | Hughes | Feb. 25, 1868 |
| 1,309,979 | Booker | July 15, 1919 |
| 2,188,481 | Otterbacker | Jan. 30, 1940 |
| 2,406,624 | Newberg et al. | Aug. 27, 1946 |
| 2,523,483 | Stern | Sept. 26, 1950 |
| 2,611,704 | Jaeger | Sept. 23, 1952 |

OTHER REFERENCES

"A Treatise on Baking," 1934, by J. E. Wihlfahrt, published by Standard Brands Inc. (New York), pp. 50 and 51.

"Invertase," a monograph by C. Neuberg and I. S. Roberts, 1946, published by Sugar Research Foundation, Inc. (New York), Scientific Report Series No. 4, pp. 44 and 45.